(12) United States Patent
Olsson et al.

(10) Patent No.: US 9,682,379 B2
(45) Date of Patent: Jun. 20, 2017

(54) WEAR-RESISTANT ROLLER

(71) Applicant: FLSmidth A/S, Valby (DK)

(72) Inventors: David Dam Olsson, Skodstrup (DK);
Niels Ole Cedargaard, Randers (DK);
Mads Wraa Hyttel, Marslet (DK)

(73) Assignee: FLSmidth A/S (DK)

( * ) Notice: Subject to any disclaimer, the term of this patent is extended or adjusted under 35 U.S.C. 154(b) by 0 days.

(21) Appl. No.: 15/316,697

(22) PCT Filed: Jun. 3, 2015

(86) PCT No.: PCT/DK2015/050142
§ 371 (c)(1),
(2) Date: Dec. 6, 2016

(87) PCT Pub. No.: WO2015/188828
PCT Pub. Date: Dec. 17, 2015

(65) Prior Publication Data
US 2017/0144162 A1 May 25, 2017

(30) Foreign Application Priority Data

Jun. 10, 2014 (DK) .................................. 2014 70344

(51) Int. Cl.
*B02C 4/30* (2006.01)
*B23K 10/02* (2006.01)
*B23K 101/34* (2006.01)

(52) U.S. Cl.
CPC ............ *B02C 4/305* (2013.01); *B23K 10/027* (2013.01); *B23K 2201/35* (2015.10)

(58) Field of Classification Search
CPC ......... B02C 4/305; B02C 4/30; B23K 10/027; B23K 2201/35
See application file for complete search history.

(56) References Cited

U.S. PATENT DOCUMENTS

| 4,733,446 A | 3/1988 | Kuroki et al. |
| 5,165,613 A | 11/1992 | Keller |
| (Continued) | | |

FOREIGN PATENT DOCUMENTS

| DE | 4038798 A1 | 6/1992 | |
| JP | 62-13268 | * 1/1987 | ............... B23K 9/04 |

OTHER PUBLICATIONS

The International Search Report and Written Opinion dated Sep. 9, 2015, 11 pages.

*Primary Examiner* — Mark Rosenbaum
(74) *Attorney, Agent, or Firm* — Matthew R. Weaver; Daniel DeJoseph; Jeffrey A. Sharp (57) ABSTRACT

The invention relates to a wear-resistant roller for crushing of particulate material, such as crude ore for use in the cement or minerals industry comprising a roller body, a wear surface on the roller body. The wear surface comprises welding beads comprising a primary fraction of carbide material and a secondary fraction of material selected from the group consisting of Nickel, Nickel alloys, mixtures of Nickel and Nickel alloys and mixtures of Nickel containing refractory hard materials, Cobalt, Cobalt alloys, mixtures of Cobalt and Cobalt alloys and mixtures of Cobalt containing refractory hard materials. Furthermore, the welding beads are welded to the roller body in an overlapping manner such that two neighbouring welding beads comprise an overlapping volume and a non-overlapping volume, the overlapping volume being an intersection volume between the two neighbouring overlapping welding beads, and the fraction of carbide material being higher in the overlapping volume than in the non-overlapping volume such that the overlapping volume has a higher wear resistance compared to the non-overlapping volume having a lower wear-resistance.

(Continued)

Also the invention relates to a method of forming such a wear surface on a roller body.

19 Claims, 9 Drawing Sheets

(56) References Cited

U.S. PATENT DOCUMENTS

| | | | |
|---|---|---|---|
| 5,516,053 A | 5/1996 | Hannu | |
| 5,624,717 A * | 4/1997 | Proner | B23K 9/046 |
| | | | 219/121.37 |
| 2009/0019783 A1* | 1/2009 | Amano | B23K 9/04 |
| | | | 51/309 |

* cited by examiner

WEAR-RESISTANT ROLLER

FIELD OF THE INVENTION

The present invention relates to a wear-resistant roller for crushing of particulate material, such as crude ore for use in the cement or minerals industry comprising a roller body, a wear surface on the roller body. The wear surface comprises welding beads comprising a primary fraction of carbide material and a secondary fraction of material selected from the group consisting of Nickel, Nickel alloys, mixtures of Nickel and Nickel alloys and mixtures of Nickel containing refractory hard materials, Cobalt, Cobalt alloys, mixtures of Cobalt and Cobalt alloys and mixtures of Cobalt containing refractory hard materials. Furthermore, the welding beads are welded to the roller body in an overlapping manner such that two neighbouring welding beads comprise an overlapping volume and a non-overlapping volume, the overlapping volume being an intersection volume between the two neighbouring overlapping welding beads, and the fraction of carbide material being higher in the overlapping volume than in the non-overlapping volume such that the overlapping volume has a higher wear resistance compared to the non-overlapping volume having a lower wear-resistance. Also the invention relates to a method of forming such a wear surface on a roller body.

BACKGROUND ART

Covering roller bodies with a wear surface comprising wear-resistant materials is well-known in the art of milling. The wear surface may comprise wear-resistant materials implemented by wear-resistant studs implemented in the surface or as in wear-resistant rollers of the abovementioned kind comprise welding beads with high contents of carbide. Carbides has long been known to have a hardness close to that of diamond and has consequently been used extensively for cutting or grinding in situations requiring extreme resistance to wear and abrasions. Welding beads comprising wear and abrasion resistant materials welded on a roller is often referred to as hardfacing of the roller. Using studded technologies is often too expensive either to install or maintain, and often also inadequate when working with very high pressures such as in roller mills or roller crushers due to failure of attachment to the roller body. The wear-resistant material of which the studs are made is very expensive and since a part of each stud is embedded in the roller for fastening the stud, and only a smaller portion of the stud protrudes from the roller surface and is actually utilized as wear-resistant material, most of the expensive material is not subjected to wear, which is a poor utilization of the wear-resistant material.

Hardfacing on the other hand has the advantage of being less expensive, fairly easy to maintain and capability of withstanding extremely high pressures. However, a well-known disadvantage of hardfacing is the lack of gripping capability when a hard-faced surface is worn sometimes even only slightly worn. Wear on hard-faced surfaces typically results in the wear surface very quickly becoming completely smooth drastically decreasing the crushing effectiveness of the roller. In order to counter this effect, new layers of hardfacing must frequently be welded to the surface in appropriate patterns leading to increased downtimes of the mills using the hard-faced rollers.

Therefore it would be advantageous to be able to use hard-faced surfaces while maintaining a structured surface like the studded surface for maximum gripping capability in order to optimize the wear-resistance of the roller, maintain a high grinding efficiency to increase the service life of the roller,

SUMMARY OF THE INVENTION

It is an object of the present invention to wholly or partly overcome the above disadvantages and drawbacks of the prior art. More specifically, it is an object to provide an improved wear-resistant roller of the kind mentioned in the introduction, and being characterized in that the wear-resistant roller comprises welding beads being welded to the roller body in an overlapping manner such that a fraction of carbide material in the welding beads is higher in an overlapping volume than in a non-overlapping volume such that the overlapping volume has a higher wear resistance compared to the non-overlapping volume having a lower wear-resistance. Also it is an object of the present invention to provide a method of forming a wear surface on a roller body, characterized in welding a second welding bead partially overlapping a first welding bead thereby re-heating an overlapping volume of the first welding bead, The above objects, together with numerous other objects, advantages, and features, which will become evident from the below description, are accomplished by a solution in accordance with the present invention by a wear-resistant roller for crushing of particulate material, such as crude ore for use in the cement or minerals industry comprising:
a roller body,
a wear surface on the roller body,
the wear surface comprising welding beads comprising a primary fraction of carbide material and a secondary fraction of material selected from the group consisting of Nickel, Nickel alloys, mixtures of Nickel and Nickel alloys and mixtures of Nickel containing refractory hard materials, Cobalt, Cobalt alloys, mixtures of Cobalt and Cobalt alloys and mixtures of Cobalt containing refractory hard materials,
the welding beads being welded to the roller body in an overlapping manner such that two neighbouring welding beads comprise an overlapping volume and a non-overlapping volume, the overlapping volume being an intersection volume between the two neighbouring overlapping welding beads, and the overlapping volume having a higher wear resistance compared to the non-overlapping volume having a lower wear-resistance.

In one embodiment, the wear-resistant roller comprises:
a roller body,
a wear surface on the roller body,
the wear surface comprising welding beads comprising a primary fraction of carbide material and a secondary fraction of material selected from the group consisting of Nickel, Nickel alloys, mixtures of Nickel and Nickel alloys and mixtures of Nickel containing refractory hard materials, Cobalt, Cobalt alloys, mixtures of Cobalt and Cobalt alloys and mixtures of Cobalt containing refractory hard materials,
the welding beads being welded to the roller body in an overlapping manner such that two neighbouring welding beads comprise an overlapping volume and a non-overlapping volume, the overlapping volume being an intersection volume between the two neighbouring overlapping welding beads, and
the fraction of carbide material being higher in the overlapping volume than in the non-overlapping volume such that the overlapping volume has a higher wear resistance compared to the non-overlapping volume having a lower wear-resistance.

In one embodiment, the welding beads are Plasma Transfer Arc (PTA) welding beads and the primary fraction of carbide material preferably comprises 40-70%, or more preferably 50-66% or even more preferably 58-62% of tungsten carbides and wherein the secondary fraction of material preferably comprises 30-50%, or more preferably 35-45% or even more preferably 38-42% of material selected from the group consisting of Nickel, Nickel alloys, mixtures of Nickel and Nickel alloys and mixtures of Nickel containing refractory hard materials, Cobalt, Cobalt alloys, mixtures of Cobalt and Cobalt alloys and mixtures of Cobalt containing refractory hard materials.

Increasing the volume of carbide makes the wear surface more expensive, and if the carbide/metal matrix has too high contents of carbides the surface becomes brittle. On the other hand reducing the carbide contents too much decreases the wear resistance of the wear surface.

In another embodiment the wear surface may have a pre-wear wear surface profile with overlapping volumes being lower in a radial direction than non-overlapping volumes, and a post-wear wear surface profile with overlapping volumes being higher in the radial direction than non-overlapping.

The post-wear wear surface profile of the roller is very important since most running ours will be defined by this profile.

Moreover, a height of the overlapping volumes being higher in the radial direction than non-overlapping volumes in the post-wear profile together with an intermediate distance between two neighbouring overlapping volumes may define a recess for retention of particulate material defining an autogenous wear layer protecting the non-overlapping volumes from further wear.

An appropriate welding bead thickness and intermediate distance between two overlapping volumes lead to appropriate conditions of an autogenous wear layer i.e. crushed material in retention to the roller surface thereby acting as a wear surface itself. The autogenous wear layer is very attractive since wear is applied to the crushing material and not to the expensive wear surface.

Further the intermediate distance between two neighbouring overlapping volumes may be tailored to ensure retention of an autogenous wear layer for a certain type of crushed mineral feed.

The retention capability of a surface may be optimized for a certain type of crushed material given the moisture content, the hardness, etc. This will allow the user to optimize retention capability e.g. for a specific quarry or geographical region.

The intermediate distance between two neighbouring overlapping volumes may in some embodiments be 10 to 20 mm to ensure retention of an autogenous wear layer of grinded grey cement clinker.

The concept of utilizing surface macro texture on roller surfaces for grinding cement clinker, slag or hard minerals is well known with both cement and mining industry. In case of welding a wear resistant overlay, such macro textures consist of beads welded directly on top of a thicker deposit layer. As the weld material selected for the texture does not possess better wear resistance than the thicker deposit, it very quickly wears away. This implies that traditional macro textures only have a limited functionality and the lifetime for such textures when grinding cement clinker may be as low as 10% compared to the overall lifetime of the roller surface.

Also, the overlapping volume may be narrow and the non-overlapping volume being broad, the overlapping volume being a narrow intersection volume between the two neighbouring broad overlapping welding beads.

The autogenous wear layer is very attractive since wear is applied to the crushing material and not to the expensive wear surface and therefore it is preferable to have a narrow high wear resistant region and broad autogenous wear region. When the lower wear material of the non-overlapping regions is sufficiently worn the non-overlapping volumes are covered with crushed material attached to the surface between overlapping volumes of higher wear material.

The wear surface may comprises a series of circumferential welding beads wherein neighbouring circumferential welding beads are overlapping neighbouring circumferential welding beads thus defining circumferential overlapping volumes such that the extension of the overlapping volumes substantially follows the circumferential direction of the wear-resistant roller.

The beads are preferably oriented along the circumference of the roller following the direction of rotation of the roller, The welding beads may have a linear shape, a sinusoidal shape, a zigzag shaped or a step-function shape in the circumferential direction.

The welding beads extending along the circumference may be linear or have an appropriate alternating shape e.g. to allow the distance between overlapping regions to be longer than the width of the welding beads if appropriate for optimal retention of autogenous layer.

The overlapping volume may have a linear shape in the circumferential direction while the welding beads have a sinusoidal shape, a zigzag shaped or a step-function shape in the circumferential direction.

The overlapping volume may have a linear shape even though the welding beads have not to ensure an optimal post-wear wear surface profile of the roller, Also the overlapping volume may have a sinusoidal shape, a zigzag shaped or a step-function shape in the circumferential direction.

Retention of crushed material may for some types of crushed materials preferably also have a sinusoidal shape, a zigzag shaped or a step-function shape in the circumferential direction.

The welding beads may preferably have a width of preferably 8 mm to 24 mm, or more preferably a width of from 10 mm to 22 mm or even more preferably a width of from 12 mm to 20 mm.

The overlapping volume may preferably have a width of 0.5 mm to 8 mm, or more preferably a width of from 1 mm to 4 mm or even more preferably a width of from 1 mm to 3 mm.

The method of forming a wear surface on a roller body may also be characterized in welding a series of welding beads side-by-side each welding bead partially overlapping neighbouring welding beads.

The welding beads may have a sinusoidal shape, a zigzag shaped or a step-function shape comprising a left turn point and a right turn point region and wherein welding the second welding results in overlapping the first welding in the turn point region.

Also, a speed of welding the second welding may be lowered during welding in the turn point region thereby increasing a welding dwell time in the turn point region.

Slowing down the welding speed in the turning point regions increases the dwell time allowing improved up-concentration of carbide material in the overlapping region.

Further, a welding current during welding of the second welding is increased during welding in the turn point region thereby increasing an energy input to the overlapping region in the turn point region.

Increasing the welding current in the turning point regions increases the energy input thereby increasing temperature and mobility of carbide particles in the metal matrix allowing improved up-concentration of carbide material in the overlapping region.

In an embodiment of the invention wherein a series of welding beads have a sinusoidal shape, a zigzag shaped or a step-function shape comprising a left turn point and a right turn point region and wherein welding the second welding results in overlapping the first welding in the turn point region a direction of a welding torch for welding the welding beads may be changed from a radial direction between the left and right turning point regions to a tilted direction in the left and right turning point regions thus altering carbide volume of the overlapping sections.

BRIEF DESCRIPTION OF THE DRAWINGS

The invention and its many advantages will be described in more detail below with reference to the accompanying schematic drawings, which for the purpose of illustration show some non-limiting embodiments and in which.

All the figures are highly schematic and not necessarily to scale, and they show only those parts which are necessary in order to elucidate the invention, other parts being omitted or merely suggested.

DETAILED DESCRIPTION OF THE INVENTION

Figure 1:
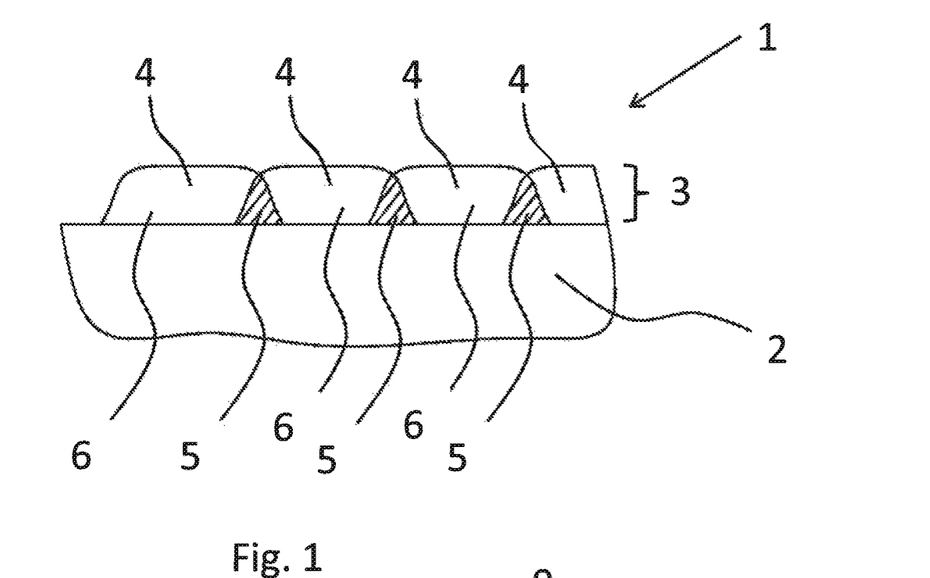
FIG. 1 shows a cross-sectional view of a wear-resistant roller having a pre-wear wear surface profile.
Figure 2:
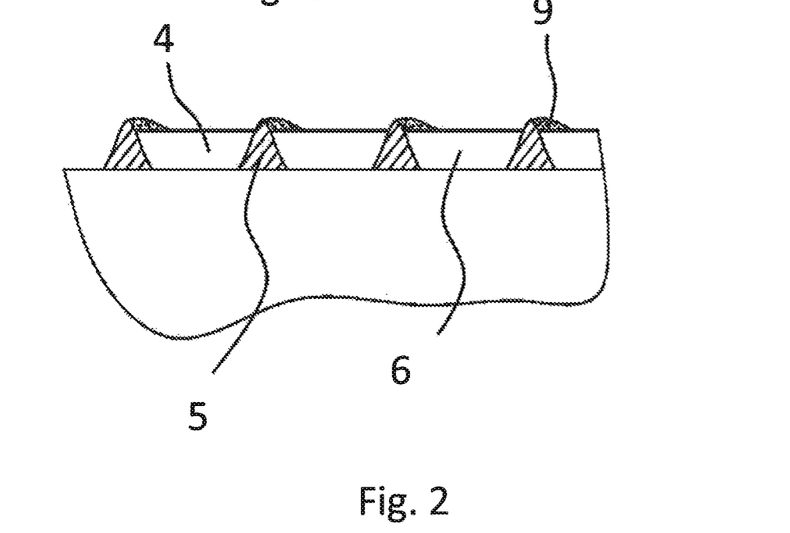
FIG. 2 shows a cross-sectional view of a wear-resistant roller having a post-wear wear surface profile.

FIG. 1 shows a cross-sectional view of a wear-resistant roller 1 comprising a roller body 2 and a wear surface 3 on the roller body. The wear surface comprises welding beads 4 are welded to the roller body in an overlapping manner such that two neighbouring welding beads comprise an overlapping volume 5 and a non-overlapping volume 6. The welding beads comprises a primary fraction of carbide material and a secondary fraction of material selected from the group consisting of Nickel, Nickel alloys, mixtures of Nickel and Nickel alloys and mixtures of Nickel containing refractory hard materials, Cobalt, Cobalt alloys, mixtures of Cobalt and Cobalt alloys and mixtures of Cobalt containing refractory hard materials. The carbide material in the primary fraction has a very high wear resistance when distributed in a matrix with the secondary fraction of material. Alone the carbide material may become too brittle but in combination with the secondary material a very high wear resistance is obtained. When the welding beads are welded to the roller body in an overlapping manner as described above the overlapping volumes or regions are re-heated during welding of a neighbouring welding bead. The primary fraction of material concentrates in the lower parts of the overlapping volumes close to the roller body such that the overlapping volumes have a higher wear resistance compared to the non-overlapping volume having a lower wear-resistance. This introduces a difference in wear-resistance which is very attractive to wear surfaces since the non-overlapping volumes relatively quickly will wear of the surface and a pattern of macro structures suddenly protrude from the wear-surface as a consequence of low wear resistant non-overlapping volumes more quickly wearing off. The pattern of protruding overlapping volumes is made from material having a higher concentration of primary fraction material and thus being very wear resistant and furthermore acts as retaining macro structures for retaining an autogenous wear layer from grinded material between the overlapping volumes. FIG. 2 shows cross-sectional view of a wear-resistant roller 1 wherein the wear surface 3 has been partially worn such that the overlapping volumes 5 protrude from the surface in a pattern of protruding overlapping volumes 5. Also seen in FIG. 2 is the initial build-up of an autogenous wear layer 9 on one side of the protruding overlapping volumes 5.

Figure 3A:
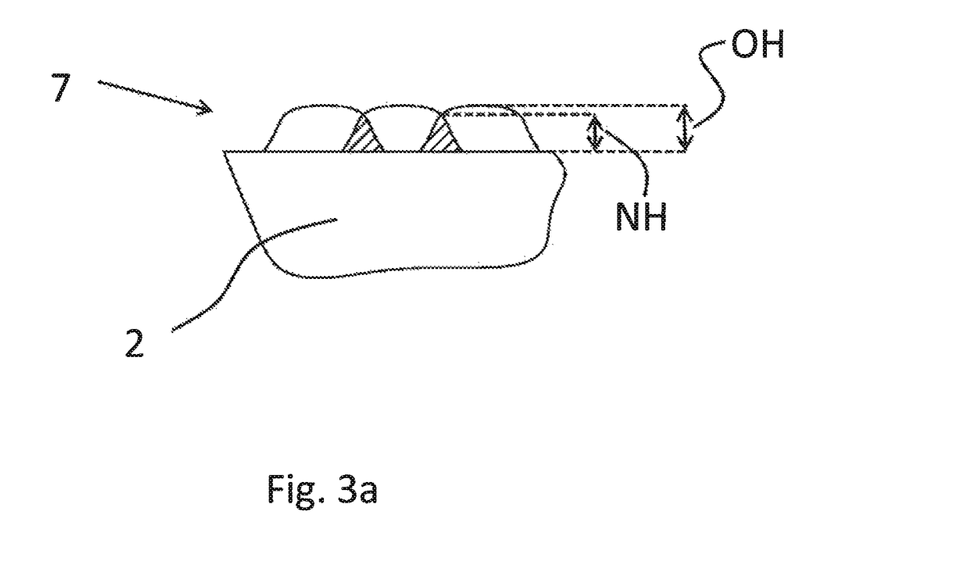
FIG. 3a shows a cross-sectional view of a wear-resistant roller having a pre-wear wear surface profile.
Figure 3B:
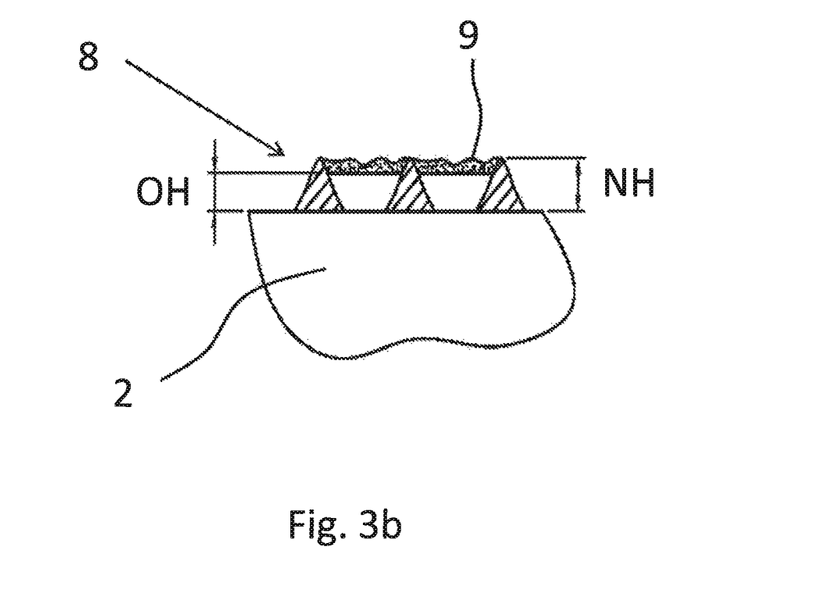
FIG. 3b shows a cross-sectional view of a wear-resistant roller having a post-wear wear surface profile.
Figure 4A:
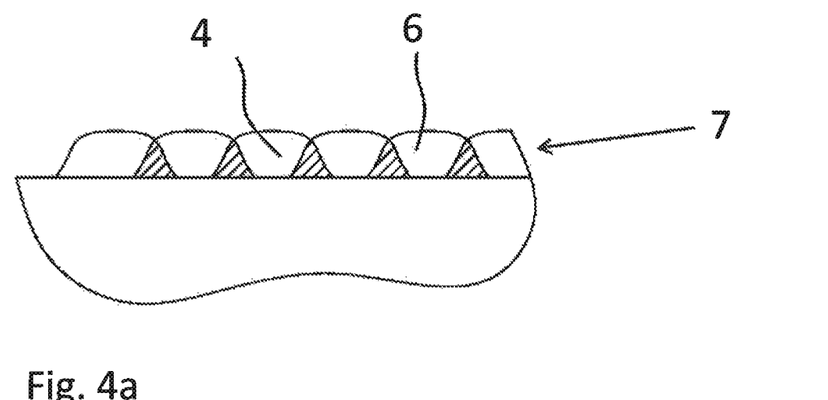
FIG. 4a shows a cross-sectional view of a wear-resistant roller having a pre-wear wear surface profile.
Figure 4B:
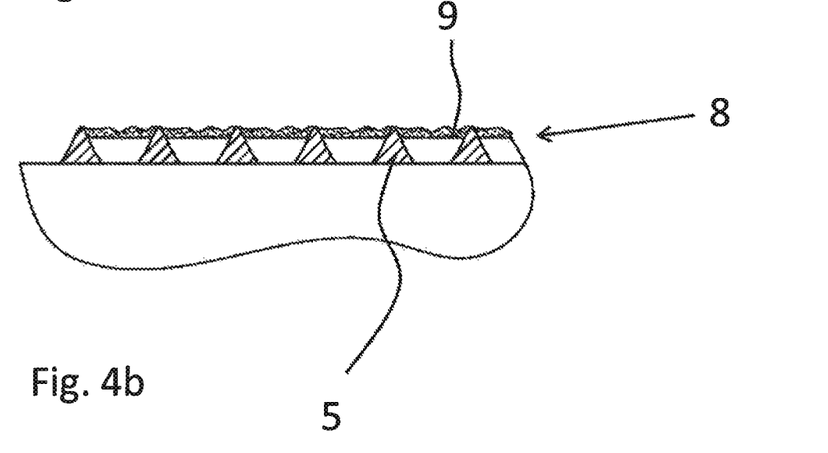
FIG. 4b shows a cross-sectional view of a wear-resistant roller having a post-wear wear surface profile.

FIG. 3a shows a cross-sectional view of a wear-resistant roller 1 wherein the wear surface 3 has a pre-wear wear surface profile 7 with overlapping volumes 5 having an overlap height OH and non-overlapping volumes 6 having a non-overlap height NH, and wherein the non-overlap height NH is higher than the overlap height OH in the a pre-wear wear surface profile 7. FIG. 3b shows a cross-sectional view of a wear-resistant roller 1 wherein the wear surface 3 has a post-wear wear surface profile 8, wherein the overlap height OH is higher than the non-overlap height NH. In traditional hard facing techniques wherein a wear surface is welded to a roller body 2, the welding beads make up the macrostructure of the wear surface. According to the invention the post-wear wear surface profile make up the macro structure of the wear surface. Therefore the wear-resistant roller according to the invention has a transient initial shape wherein the shape of the wear surface 3 changes from the pre-wear wear surface profile 7 to the post-wear wear surface profile 8. The grinding effectiveness may therefore reach a narrow minimum when the overlapping height OH equals the non-overlapping height NH and optimum grinding effectiveness when the difference between the overlapping height OH and the non-overlapping height NH is large. In the initial phase when the overlapping height OH is lower than the non-overlapping height NH the non-overlapping volumes make up the macro structure of the wear surface 3 ensuring a good grinding effectiveness, however, this transient period is very short compared to the lifetime of the wear surface 3 maybe less than a tenth of the lifetime. In the more stable phase wherein the overlapping height OH is higher than the non-overlapping height NH, the overlapping volumes make up the macro structure of the wear surface 3 together with an autogenous wear layer 9 between neighbouring overlapping volumes 5 thereby ensuring a good grinding effectiveness, and this stable period is very long compared to the lifetime of the wear surface 3. As shown in FIGS. 4a and 4b the pre-wear wear surface profile 7 is defined mainly by the non-overlapping volumes 6 whereas the post-wear wear surface profile 8 is defined mainly by the non-overlapping volumes 6 and an autogenous wear layer 9 made of grinded material sticking to the wear surface thereby protecting the non-overlapping volumes 6 beneath the autogenous wear layer 9.

The welding beads 4 may be welded using Plasma Transfer Arc (PTA) with a primary fraction of carbide material and a secondary fraction of material of material selected from the group consisting of Nickel, Nickel alloys, mixtures of Nickel and Nickel alloys and mixtures of Nickel containing refractory hard materials, Cobalt, Cobalt alloys, mixtures of Cobalt and Cobalt alloys and mixtures of Cobalt containing refractory hard materials.

Figure 5:
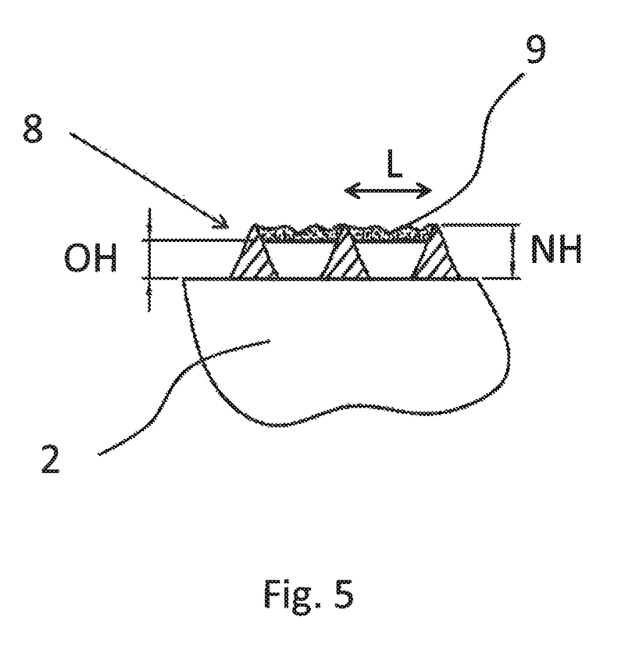
FIG. 5 shows a cross-sectional view of a wear-resistant roller having a post-wear wear surface profile.

As shown in FIG. 5 the difference between the overlapping height OH and the non-overlapping height OH in the post-wear wear surface profile 8 together with an intermediate distance L between two neighbouring overlapping volumes 5 defines a recess for retention of particulate material defining an autogenous wear layer 9 protecting the non-overlapping volumes from further wear.

Figure 6A:
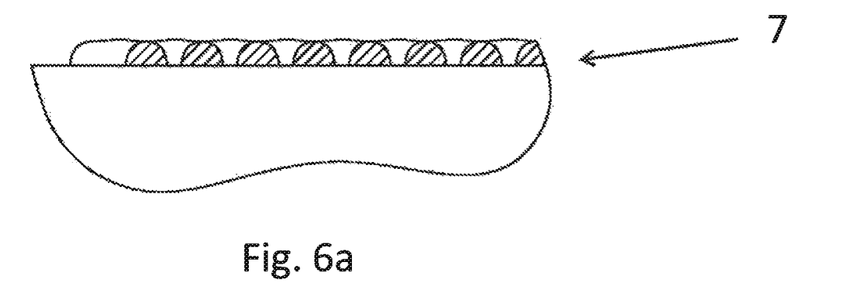
FIG. 6a shows a cross-sectional view of a wear-resistant roller having a pre-wear wear surface profile.
Figure 6B:
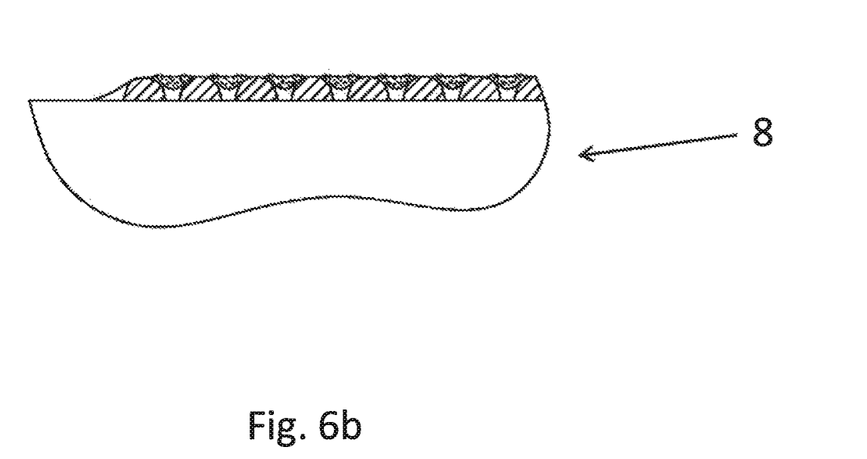
FIG. 6b shows a cross-sectional view of a wear-resistant roller having a post-wear wear surface profile.

As shown in FIG. 6a and FIG. 6b the width of the overlapping volumes may be utilized to tailor the shapes of the protruding overlapping volumes in the post-wear wear surface profile 8. An increased width of the overlapping volumes 5 as shown provides a more round profile of the protruding overlapping volumes of the post-wear wear surface profile 8 compared to e.g. the width of the overlapping volumes 5 as shown in FIGS. 4a and 4b.

The concept of utilizing surface macro texture on roller surfaces for grinding cement clinker, slag or hard minerals is well known with both cement and mining industry. In case of welding a wear resistant overlay, such macro textures consist of beads welded directly on top of a thicker deposit layer. As the weld material selected for the texture does not possess better wear resistance than the thicker deposit, it very quickly wears away. This implies that traditional macro textures only have a limited functionality and the lifetime for such textures when grinding cement clinker may be as low as 10% compared to the overall lifetime of the roller surface.

EXAMPLE 1

The described invention has been industrially proven by welding a wear surface onto a set of grinding rollers. The welding beads of the wear surfaces were welded in tangential direction next to each other across the roller width. Each welding bead had a height of approximately 3 mm and a width of approximately 16 mm width an overlap of approximately 2 mm in each side of the welding bead such that the non-overlapping volumes was approximately 12 mm wide and the overlapping volumes was approximately 2 mm. The material of the wear surface was a Nickel-Tungsten blend with fused Tungsten carbides having a corresponding weight percentage of 40 wt. % Nickel and 60 wt. % Tungsten. The material was welded to the roller body using a Plasma Transfer Arc welding process.

The wear surface comprised four layers of welding beads of 3 mm in height and thus constituted a total wear surface height of approximately 12 mm. The layers are positioned such that non-overlapping and overlapping volumes correspond between layers non-overlapping volumes on top of non-overlapping volumes and overlapping volumes on top of overlapping volumes. In this way the difference in wear-resistance between non-overlapping and overlapping volumes is maintained The rollers were installed in a roller press for grinding grey cement clinker and inspected regularly with quantitative surface measurements in order to follow the development of the micro texturing effect. The rollers were monitored with intervals of 400-500 hours of grinding grey clinker until 4.000 hours where we see a stabilization of the protruding high wear resistant overlapping volume regions and then a long term measurement indicating that wear surface can be expected to be stable for a very long lifetime at least 10.000 operating hours.

In general, the overlapping areas protrude gradually as the roller surface is worn as indicated by the measurements shown in Table 1. The observations revealed that the protruding sections have the ability to retain fines of the crushed feed which creates autogenous layers yielding self-introduced wear protection. As the rollers became worn, increasing friction of the rollers were correspondingly measured from power readings, production rate and other essential data. When the rollers had reached almost fully developed protruding overlapping volumes at 900 hours, and the rollers are still fully functional at 10,000 hours of operation by grinding feed of grey cement clinker. In comparison, macro structure textures would not last no way near as long indicated by the complete wear of the macro structure textures from 0-150 hours and using conventional macro structure textures would thus need repeated re-welding implying costly production stop and risk of damages of underlying welding beads.

TABLE 1

| Operating hours | Protrusion of Overlapping volume (OH—NH) | Radial wear, Invention | Radial wear, Traditional weld |
|---|---|---|---|
| 0 | −0.2 mm | 0.00 mm | 0.00 mm |
| 150 | 0.0 mm | 0.10 mm | 0.10 mm |
| 380 | 0.3 mm | 0.09 mm | 0.15 mm |
| 900 | 1.0 mm | 0.51 mm | 0.48 mm |
| 1.400 | 1.3 mm | 0.76 mm | 0.73 mm |
| 2.330 | 1.4 mm | 0.97 mm | 1.20 mm |
| 2.900 | 1.4 mm | 0.99 mm | 1.46 mm |
| 3.200 | 1.4 mm | 1.04 mm | 1.63 mm |
| 4.000 | 1.5 mm | 1.05 mm | 2.03 mm |
| 10.000 | 1.5 mm | 2.00 mm | 8.00 mm |

EXAMPLE 2

Occurrence of the micro-texture effect is not dependent on the characteristics of feed material, i.e. the type of mineral being grinded. Harder minerals than cement clinker like mineral ores also imply selective wear of the welding beads; the overlapping regions wears less than the non-overlapping of the beads leading to a surface texture having the feature of retaining fines thus create autogenous layers. The autogenous layers mean less overall wear and higher friction of the roller surface which is beneficial for the productivity of the grinding operation. Very hard and abrasive minerals ores like Co, Fe or diamond enriched ones tends to increase the difference of wear rate between the two regions implying that the protruding height of the overlapping sections even increase compared to grinding less hard and abrasive minerals as for example cement clinker. However in case of the more hard and abrasive ores, the protruding sections are smoothen out resulting in a wavy shape which is not prone to fracture which is advantageous.

Figure 7A:
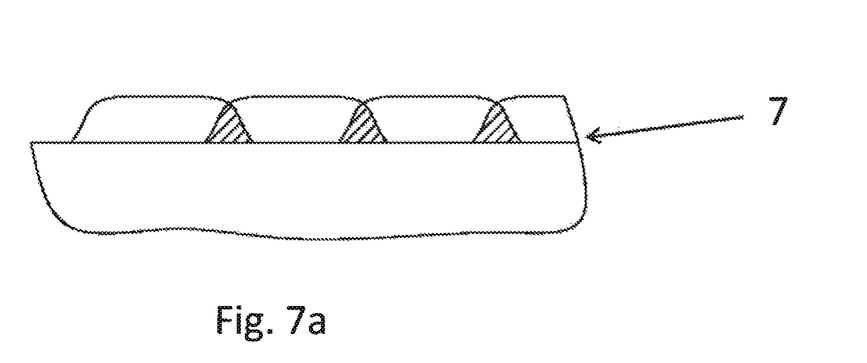
FIG. 7a shows a cross-sectional view of a wear-resistant roller having a pre-wear wear surface profile.
Figure 7B:
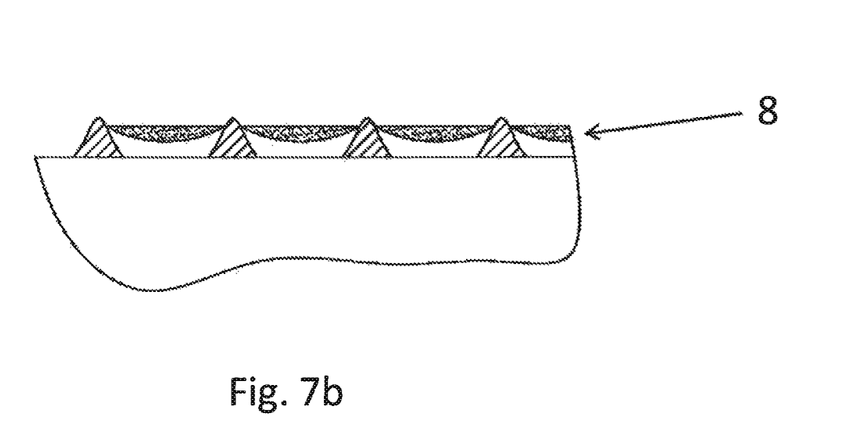
FIG. 7b shows a cross-sectional view of a wear-resistant roller having a post-wear wear surface profile.

As shown schematically in FIG. 7a and FIG. 7b the wear of the non-overlapping volumes 6 obtains a more wavy shape in the post-wear wear surface profile 8 which is not prone to fracture which is again advantageous.

The overlapping volume 5 may be described as an intersection volume between two neighbouring overlapping welding beads 4.

Wear resistance of metal alloys rely on the presence of hard phases as a part of the microstructure composition. Such hard phases can be formed in various ways whereas the most common method is addition of alloying elements. Non-metallic precipitates yield hard but also brittle ceramic phases which are referred to as carbides, nitrides, borides etc. Traditional weld overlay of grinding rollers are done by Open Arc Welding (OAW). OAW is an arc welding process in which a bare wire electrode and inert or active shielding gas are fed to a weld pool through a welding gun. The drawback of traditional hardfacing is a high energy input but the advantage is a simple equipment setup. Traditional weld overlay materials are typically iron based having added elements like C to form simple martensitic steel, but also hypereutectic alloys having C, B and Cr as well as other metallic elements like Nb, V, W, Mo and Co are used. In case of OAW, hard phases have to form by precipitation of carbides as a result of chemistry and cooling rates of weld pool. The carbides which solidify from the melt typically make up approximately 50 volume-% of the final composition. The initial chemistry of welding consumables determines the type of precipitated carbides. Each type of carbide has a certain hardness and brittleness. Use of simple martensitic hardfacing alloys having no carbides imply very low service life when applied on grinding rollers for cement clinker processing. More advanced alloys having monocarbides formed by Ti, Nb or V gives better results in terms of longer lifetime. However, alloys which rely on precipitation of carbides will not offer the possibility of locally increase hardness of re-welded regions. This is due to the fact that reheating would not be beneficial for precipitation of carbides and because traditional flux wire welding requires high energy input implying likely damages of already deposited areas. Another drawback of especially traditional flux wire welding is the width of welding beads which inherent to the process are very narrow. Hence, overlap welding is practically not feasible by traditional welding processes and material compositions.

Using Plasma Transfer Arc (PTA) however offers the possibility of producing wide welding beads as the torch can be oscillated simultaneously while moving forward. In case of PTA, welding consumables can be fed as powders meaning that primary carbides can be introduced directly into the welding pool. These carbides may consist of different compositions, but cemented tungsten carbide types are preferred due to excellent properties in terms of hardness and toughness. Re-welding can be done using PTA without damaging existing deposit compositions as the energy input is low and very controllable compared to other welding processes. Selecting an optimized mixture of primary tungsten carbide particles and a binder matrix material furthermore yield a volumetric increase of carbides in overlapping areas thus results in increase of wear resistance correspondingly.

Figure 8A:
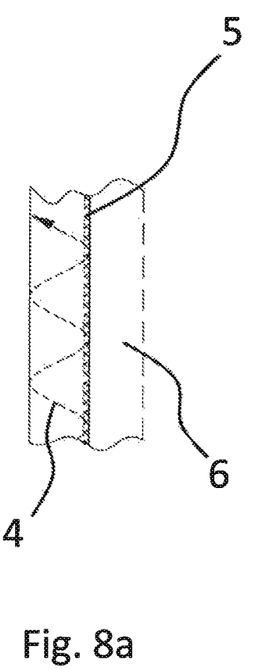
FIG. 8a shows a top view of two neighbouring welding beads with an overlapping volume.
Figure 8B:
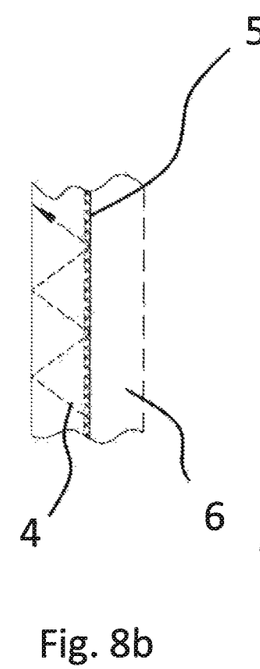
FIG. 8b shows a top view of two neighbouring welding beads with an overlapping volume.
Figure 8C:
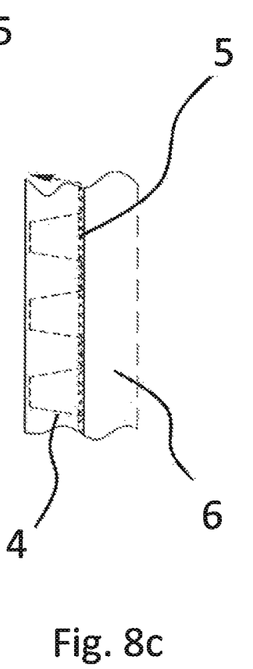
FIG. 8c shows a top view of two neighbouring welding beads with an overlapping volume.

The wear surface may comprise a series of circumferential welding beads wherein neighbouring circumferential welding beads are overlapping neighbouring circumferential welding beads thus defining circumferential overlapping volumes such that the extension of the overlapping volumes substantially follows the circumferential direction of the wear-resistant roller. However, in some embodiments of the invention the welding beads instead of having a linear shape have a sinusoidal shape, a zigzag shaped or a step-function shape in the circumferential direction. Especially, when designing wear surfaces where the length L between neighbouring overlapping volumes needs to be higher than the width of the welding beads this may be appropriate. The overlapping volumes may still obtain a linear shape in the circumferential direction as shown FIGS. 8a-8c since the overlap between neighbouring welding beads only at least substantially extends in the circumferential direction. By welding beads in larger patterns also the overlapping volumes may be tailored to have a sinusoidal shape, a zigzag shaped or a step-function shape in the circumferential direction.

Figure 9:
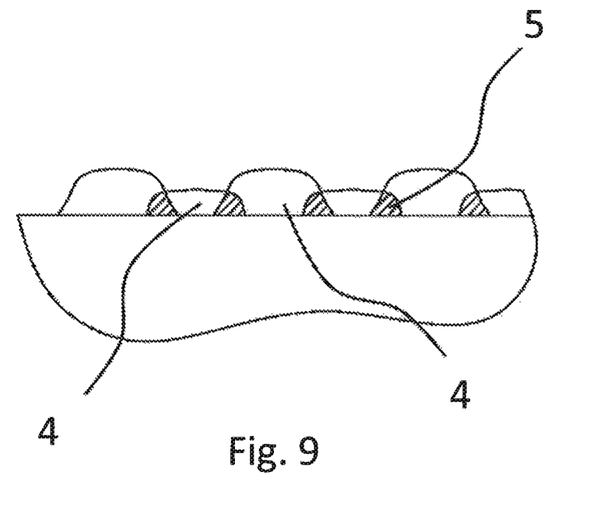
FIG. 9 shows a cross-sectional view of a wear-resistant roller having a pre-wear wear surface profile.

FIG. 9 shows a cross-sectional view of a wear-resistant roller 1 wherein neighbouring welding beads 4 do not have the same height. This feature may be used to prolong the transient period where the non-overlapping volumes make up the macro structure of the grinding surface thus prolonging the lifetime of the characteristics of the pre-wear wear surface profile 7 before obtaining the post-wear wear surface profile with protruding overlapping volumes 5.

Figure 10A:
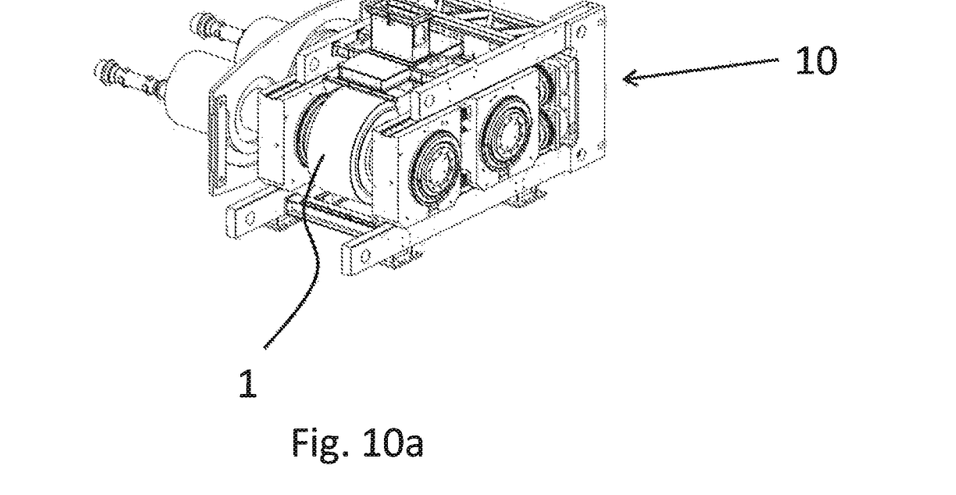
FIG. 10a shows a perspective view of a hydraulic roller press type roller mill.
Figure 10B:
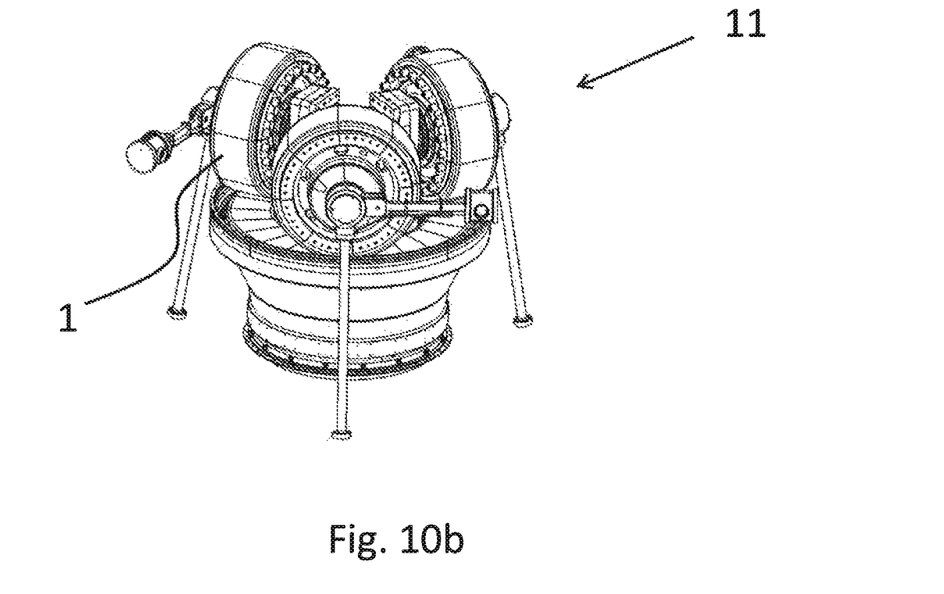
FIG. 10b shows a perspective view of a vertical mill type roller mill.

The wear-resistant roller 1 according to the invention may be implemented in a roller press 10, a vertical mill 11 or other appropriate grinding apparatus or comminution devices. Perspective views of a roller press 10 and a vertical mill 11 are shown in FIGS. 10a and 10b.

In a method of forming a wear surface on a roller body according to the invention a first steps comprises welding of a first welding bead comprising a primary fraction of carbide material and a secondary fraction of material selected from the group consisting of Nickel, Nickel alloys, mixtures of Nickel and Nickel alloys and mixtures of Nickel containing refractory hard materials, Cobalt, Cobalt alloys, mixtures of Cobalt and Cobalt alloys and mixtures of Cobalt containing refractory hard materials onto a roller body.

After the first welding bead a second welding bead is welded to the roller body partially overlapping the first welding bead thereby re-heating an overlapping volume of the first welding bead. The partial overlap ensures re-heating of the overlapping volume thereby increasing the wear resistance in this volume by up-concentration of carbides in the lower parts of the overlapping volume close to the roller body.

Typically, the method comprises welding a series of welding beads side-by-side each welding bead partially overlapping neighbouring welding beads in order to fill out most of or the entire surface of the roller body.

The series of welding beads may have a sinusoidal shape, a zigzag shaped or a step-function shape comprising a left turn point and a right turn point region and wherein welding the second welding results in overlapping the first welding in the turn point region such that the length between the overlapping volumes may possible be extended to a length exceeding the width of the welding beads.

A speed of welding the second and consecutive weldings may be lowered or increased during welding in the turn point region in order to increase a welding dwell time in the turn point region. If the welding bead path is a sinusoidal shape, a zigzag shaped or a step-function shape the welding dwell time in the overlapping volumes in order to increase or decrease the effects of re-heating in the overlapping regions.

As an analogue method of increasing or decreasing the effects of re-heating in the overlapping regions a welding current during welding of the second and consecutive weldings may be increased or decreased in the turn point regions thereby increasing or decreasing an energy input to the overlapping region in the turn point region.

Also a direction of a welding torch for welding the welding beads is changed from a radial direction between the left and right turning point regions to a tilted direction in the left and right turning point regions to increase or decrease the effects of re-heating in the overlapping regions.

The invention claimed is:

1. A wear-resistant roller for crushing of particulate material, for use in the cement or minerals industry comprising:
    a roller body,
    a wear surface on the roller body,
    the wear surface comprising welding beads comprising a primary fraction of carbide material and a secondary fraction of material selected from the group consisting of nickel, nickel alloys, mixtures of nickel and nickel alloys and mixtures of nickel containing refractory hard materials, cobalt, cobalt alloys, mixtures of cobalt and cobalt alloys and mixtures of cobalt containing refractory hard materials,
    the welding beads being welded to the roller body in an overlapping manner such that two neighbouring welding beads comprise an overlapping volume and a non-overlapping volume, and
    the overlapping volume having a higher wear resistance compared to the non-overlapping volume having a lower wear-resistance.

2. A wear-resistant roller according to claim 1, wherein the welding beads are plasma transfer arc welding beads and wherein the primary fraction of carbide material comprises 40-70% of tungsten carbides and wherein the secondary fraction of material comprises 30-50% of material selected from the group consisting of nickel, nickel alloys, mixtures of nickel and nickel alloys and mixtures of nickel containing refractory hard materials, cobalt, cobalt alloys, mixtures of cobalt and cobalt alloys and mixtures of cobalt containing refractory hard materials.

3. A wear-resistant roller according to claim 1, wherein the wear surface has a pre-wear wear surface profile with overlapping volumes having an overlap height and non-overlapping volumes having a non-overlap height, the non-overlap height being higher than the overlap height in the pre-wear wear surface profile, and a post-wear wear surface profile, wherein the overlap height is higher than the non-overlap height.

4. A wear-resistant roller according to claim 3, wherein a difference between the overlapping height and the non-overlapping height in the post-wear profile together with an intermediate distance between two neighbouring overlapping volumes defines a recess for retention of particulate material defining an autogenous wear layer protecting the non-overlapping volumes from further wear.

5. A wear-resistant roller according to claim 4, wherein the intermediate distance between two neighbouring overlapping volumes is tailored to ensure retention of an autogenous wear layer for a certain type of crushed mineral feed.

6. A wear-resistant roller according to claim 4, wherein the intermediate distance between two neighbouring overlapping volumes is 10 to 20 mm to ensure retention of an autogenous wear layer of grinded grey cement clinker.

7. A wear-resistant roller according to claim 1, wherein the wear surface comprises a series of circumferential welding beads wherein neighbouring circumferential welding beads are overlapping neighbouring circumferential welding beads thus defining circumferential overlapping volumes such that the extension of the overlapping volumes substantially follows the circumferential direction of the wear-resistant roller.

8. A wear-resistant roller according to claim 1, wherein the welding beads have a linear shape, a sinusoidal shape, a zigzag shape or a step-function shape in the circumferential direction.

9. A wear-resistant roller according to claim 8, wherein the overlapping volume has a linear shape in the circumferential direction.

10. A wear-resistant roller according to claim 1, wherein the overlapping volume has a sinusoidal shape, a zigzag shape or a step-function shape in the circumferential direction.

11. A wear-resistant roller according to claim 1, wherein the welding beads have a width of approximately 8 mm to 24 mm.

12. A wear-resistant roller according to claim 1, wherein the overlapping volume has a width of approximately 0.5 mm to 8 mm.

13. A roller mill comprising:
    a feed of material,
    at least one wear-resistant roller according to claim 1 for comminution of the feed of material, and
    the mill being a roller press or a vertical mill.

14. A method of forming a wear surface on a roller body, the method comprising the steps of:
    welding a first welding head comprising a primary fraction of carbide material and a secondary fraction of material selected from the group consisting of nickel, nickel alloys, mixtures of nickel and nickel alloys and mixtures of nickel containing refractory hard materials, cobalt, cobalt alloys, mixtures of cobalt and cobalt alloys and mixtures of cobalt containing refractory hard materials onto a roller body,
    welding a second welding bead partially overlapping the first welding bead thereby re-heating an overlapping volume of the first welding bead.

15. A method of forming a wear surface on a roller body according to claim 14, wherein a series of welding beads are welded side-by-side, each welding bead partially overlapping neighbouring welding beads.

16. A method of forming a wear surface on a roller body according to claim 14, wherein the series of welding beads have a sinusoidal shape, a zigzag shape or a step-function shape comprising a left turn point and a right turn point region and wherein welding the second welding results in overlapping the first welding in the turn point region.

17. A method of forming a wear surface on a roller body according to claim 16, wherein a speed of welding the second welding is lowered during welding in the turn point region thereby increasing a welding dwell time in the turn point region.

18. A method of forming a wear surface on a roller body according to claim 16, wherein a welding current during welding of the second welding is increased during welding in the turn point region thereby increasing an energy input to the overlapping region in the turn point region.

19. A method of forming a wear surface on a roller body according to claim 16, wherein a direction of a welding torch for welding the welding beads is changed from a radial direction between the left and right turning point regions to a tilted direction in the left and right turning point regions.

* * * * *